(No Model.) 2 Sheets—Sheet 1.
C. R. POLLARD.
MECHANICAL MOVEMENT.
No. 421,608. Patented Feb. 18, 1890.
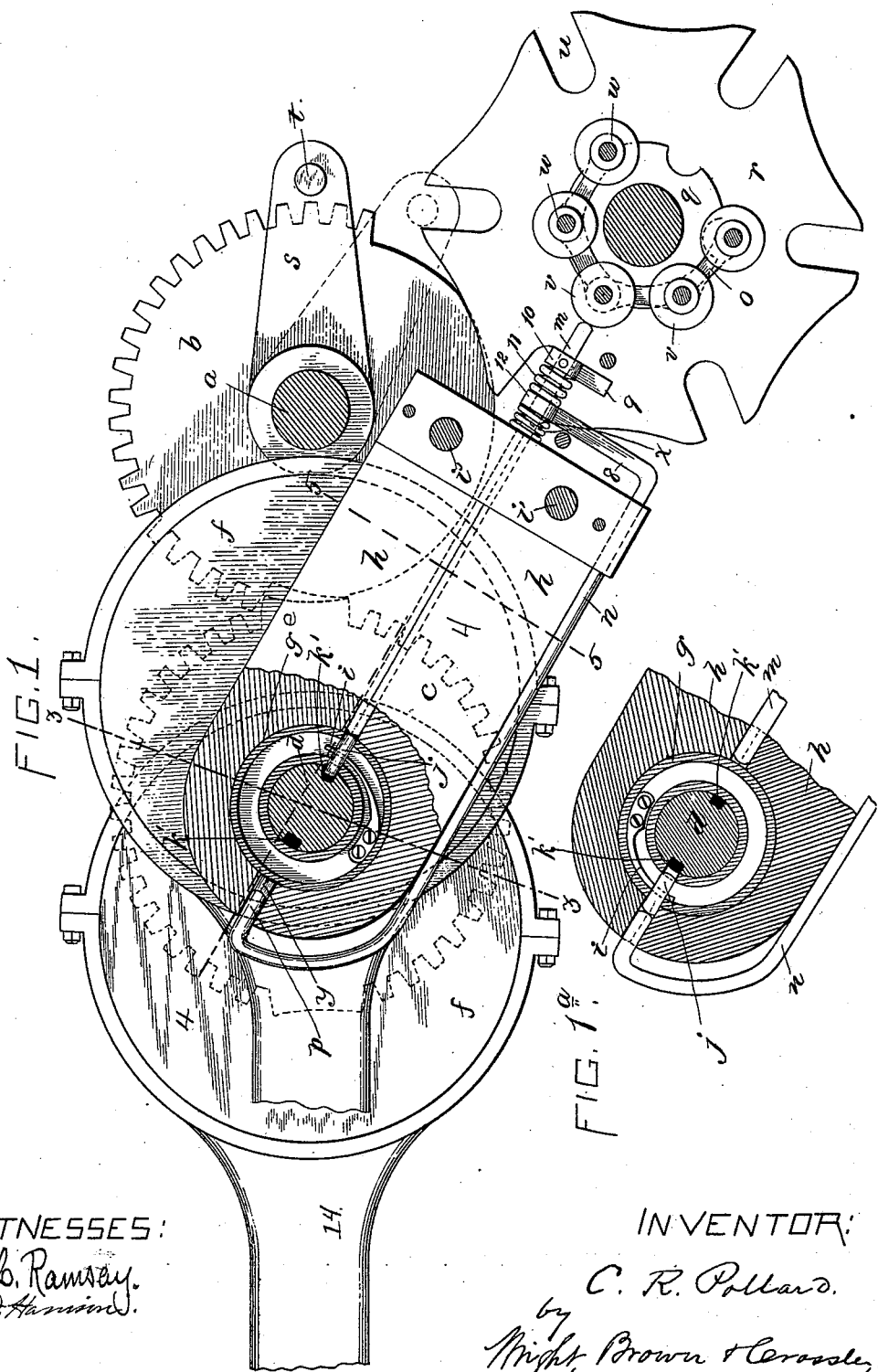
WITNESSES:
W. C. Ramsay.
A. D. Harmon.
INVENTOR:
C. R. Pollard.
by Wright, Brown & Crossley
attys.

(No Model.) 2 Sheets—Sheet 2.
C. R. POLLARD.
MECHANICAL MOVEMENT.
No. 421,608. Patented Feb. 18, 1890.
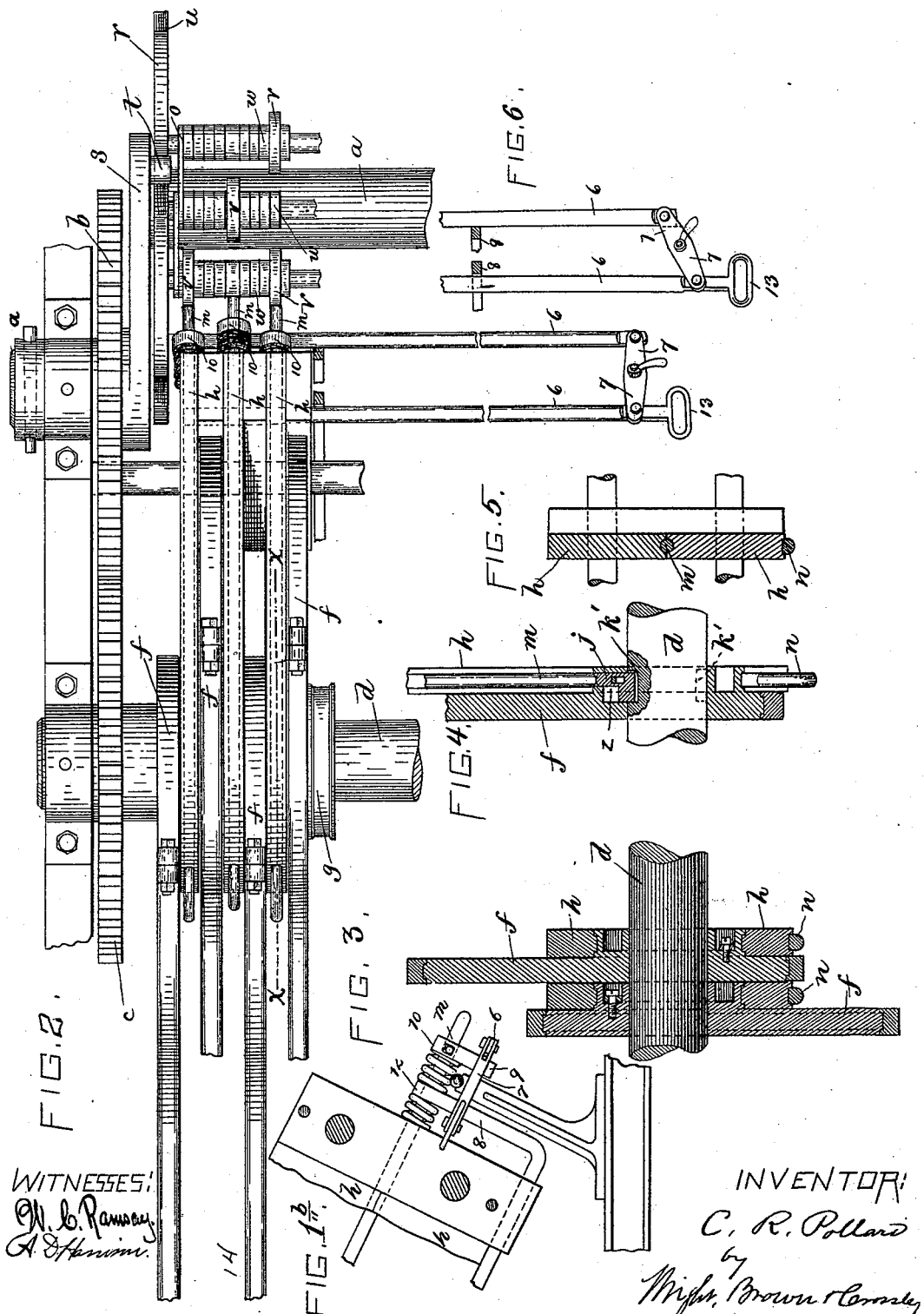
WITNESSES:
INVENTOR:
C. R. Pollard

United States Patent Office.

CHARLES RICHARD POLLARD, OF SOMERVILLE, CONNECTICUT.

MECHANICAL MOVEMENT.

SPECIFICATION forming part of Letters Patent No. 421,608, dated February 18, 1890.

Application filed June 24, 1889. Serial No. 315,371. (No model.)

*To all whom it may concern:*

Be it known that I, CHARLES RICHARD POLLARD, of Somerville, in the county of Tolland and State of Connecticut, have invented certain new and useful Improvements in Mechanical Movements, of which the following is a specification.

My invention has for its object the provision of a mechanical movement whereby the several rods of a series of such devices may be intermittingly reciprocated in a predetermined order of time, which mechanical movement may be employed for many useful purposes in the mechanic arts—as, for instance, in the operation of harnesses and shuttle-boxes in looms.

My invention consists of a series of eccentrics arranged on an intermittingly-rotating shaft, movable keys for securing said eccentrics to or releasing the same from said shaft, rods for operating on said keys to key the eccentrics to the shaft, and a pattern device for operating on the rods, a spring or other suitable device operating on the keys to move them in a direction opposite to that in which they are or may be moved by the rods.

Reference is to be had to the annexed drawings and to the letters and figures of reference marked thereon, forming a part of this specification, the same letters and figures designating the same parts or features, as the case may be, wherever they occur.

Of the drawings, Figure 1 is a vertical sectional view of an approved form and arrangement of parts comprising my invention. Fig. 1ª is a sectional detail of parts shown in Fig. 1, but representing some of the elements in a different position. Fig. 1ᵇ is a sectional detail of parts shown in Fig. 1, with additional elements for the control of said parts. Fig. 2 is a top plan view of Fig. 1. Fig. 3 is a sectional detail taken on the line 3 3 of Fig. 1. Fig. 4 is a sectional detail taken on the line 4 4 of Fig. 1. Fig. 5 is a sectional detail taken on the line 5 5 of Fig. 1. Fig. 6 is a detail view of parts represented in Fig. 2, showing said parts in a different position.

In the practical embodiment of my invention I may employ parts of various form and arrangement. As portrayed in the drawings, $a$ designates a rotary shaft, upon which is affixed a gear $b$, adapted to engage a gear $c$, secured to a shaft $d$. The teeth of the gear $b$ are mutilated in such manner that one rotation of said gear will impart but a half-rotation to gear $c$ and its shaft $d$, broad teeth $e$ on gear $c$ being contrived to act within the toothless space of gear $b$ and serve as a stop to gear $c$, somewhat on the principle of the so-called "Geneva stop," as will be clearly understood by an inspection of Fig. 1 of the drawings.

By the means described, when a regular rotary motion is given to shaft $a$, an intermittent rotary motion will be imparted to shaft $d$ in the time of a half-rotation of the latter shaft to a complete rotation of the former.

Upon the shaft $d$ are arranged a series of eccentrics $f$, each provided with a chambered hub $g$. $h\ h$ designate comb and guide plates, supported at their rear ends on rods $i\ i$ and provided toward their forward ends and in their adjacent faces with semicircular notches adapting them to fit upon a hub $g$, and so formed that at the notched point two of such plates may substantially encircle said hub, as shown in Figs. 1 and 1ª.

The eccentrics $f$ are arranged on shaft $d$, so that the latter may be rotated without affecting the former, and so that the former may at predetermined times be keyed to or connected with the latter and be actuated thereby. I have contrived various means for effecting this end, that shown in the drawings being among the most serviceable for the purpose. Each eccentric $f$ is formed and equipped in the same way as each and every other, so that in describing one a description will be given of all.

$j$ designates a pin or key arranged to operate radially in a hole formed in the hub $g$, and so as to be pressed into either one of two notches or recesses $k'$, formed in the shaft $d$, said notches being at opposite sides of the shaft. A spring $t$, arranged in the chamber of the hub and connected with the pin $j$, operates to normally press and hold the said pin out of either notch $k'$, thus disconnecting the eccentric $f$ from the shaft $d$.

$m\ n$ are rods, the former $m$ extending from the pattern-chain $o$, between the comb-plates h h, to or nearly to the hub g, and the latter n from the rearward part of the former down beneath and around the forward end of the latter, where it is provided with an angular part p, which enters between the forward ends of the comb-plates and extends to or nearly to the hub g.

The pattern-chain o is arranged on the hub q of wheel r, so as to be operated thereby, said wheel being constructed to have a step-by-step or intermittent motion imparted to it from shaft a, the means here shown consisting of an arm s, secured to shaft a and provided with a laterally-projecting pin t, adapted to engage notches u in the periphery of wheel r, and so move said wheel to an extent corresponding to the distance between two notches u. The chain o is provided in its path on a line intersecting the rear end of rods m with "risers" v and "sinkers" w, so that when a riser comes in contact with the rear end of said rod m it will press it forward against pin j, and the tension of spring t, causing said pin to pass into one of the notches k' of the shaft d, keying or connecting the eccentric f to said shaft, so as to be turned thereby. Each pin is made of such length and is so constructed that when pressed inward by rod m or n its outer end will just escape the adjacent edge of the comb-plate h and ride on the surface of the semicircular notch formed in said plate until it reaches an opposite point, when it may be thrown outward by spring t into an aperture or a notch formed between the comb-plates, as will be most clearly understood by an inspection of Figs. 1, 1ª, and 4. A riser v, coming in contact with the rear end of rod m, will press said rod inward against the tension of spring x, pressing pin j into notch k' of shaft d, as shown in Fig. 1, in which position the pin will be held by the adjacent surfaces of the comb-plates h until it reaches an opposite point, when it will be pressed outward out of notch k' into a notch y, formed between the forward ends of the comb-plates, as shown in Fig. 1ª, thus disconnecting the eccentric f from shaft d and holding it against turning therewith. When a sinker w arrives opposite the rear end of rod m, the latter will be pressed back by spring x, which will also carry rod n with it in the same direction, the effect of which will be to move the angular part p of rod n against pin j, pressing the latter into notch k', keying its associated eccentric to shaft d until the pin reaches an opposite point, when it will be forced out by spring t against the forward end of rod m into the notch formed between the adjacent faces of the comb-plates h h.

The inner end of pin j may be made broader or larger than the outer end, against which the rods m and n operate, so as to strengthen said pin at the point where the greatest strain is brought thereon by the operation of shaft d and hub g thereon, and to accommodate this enlargement of the pin the adjacent face of eccentric f may be chambered slightly, as at z, Fig. 4.

To simultaneously connect all of the eccentrics f with the shaft d, when it is desirable for any reason that this should be done, I provide the evener-rods 6 6, connected at both of their ends with levers 7, one of which rods is arranged so as to normally rest against the inner side of the vertical portion 8 of rod n, and the other against the outer or rearward side of stud 9, forming part of collar 10, secured to rod m, a spring 11, of greater tension than spring x, being interposed between collar 10 and a collar 12, forming a part of the vertical part 8, and arranged to slide on rod m, all as shown in Figs. 1 and 1ᵇ. A handle 13 may be provided on one of the rods 6, so that by moving one of said rods longitudinally both may be brought, through the medium of levers 7, closer together, as shown in Fig. 6, moving rod m and the angular part p of rod n inward, and so connecting all of the eccentrics f with shaft d, and by moving said rod longitudinally in the opposite direction said rods will be so separated as not to affect the position of the rods m n. But one of the levers 7 is shown, that on the inner ends of the rod 6 being hidden in Fig. 2 by other parts of the contrivance above it. Both levers 7 are the same in form and are pivotally connected with the rods 6 in the same way.

By the means described the rods 14, connected with the eccentrics f, may be intermittingly reciprocated at predetermined times, and this reciprocatory motion may be made of a positive character.

Having thus explained the nature and purposes of my invention and described one of the ways in which it may be constructed and used, I declare that what I claim is—

1. A mechanical movement consisting of a rotary shaft, an eccentric on said shaft, a movable key or pin for securing said eccentric to or releasing it from said shaft, rods for operating on said pin to key the eccentric to the shaft, a spring for moving the pin or key in the opposite direction, and a pattern device for operating on said rods, substantially as set forth.

2. A mechanical movement consisting of a rotary shaft, a series of eccentrics, each provided with a hub arranged on said shaft, a movable key or pin in each hub for securing said eccentrics to or releasing the same from said shaft, mechanism for acting upon said pins, and a pattern device for controlling the operation of said pin-operating mechanism, substantially as set forth.

3. A mechanical movement consisting of a rotary shaft, eccentrics thereon, each provided with a hub, a movable pin or key in said hubs for connecting the eccentrics to the shaft, the comb-plates h h, rods m n, spring $t$, and a pattern device for operating on said rods, as set forth.

4. The pin-operating rods $m$ $n$, collar 10, and lug 9, spring 11, evener-rods 6 6, and connecting-levers 7, combined and operating substantially as and for the purpose set forth.

In testimony whereof I have signed my name to this specification, in the presence of two subscribing witnesses, this 11th day of June, A. D. 1889.

CHARLES RICHARD POLLARD.

Witnesses:
ANNA D. POLLARD,
SELONA P. GARLAND.